Aug. 21, 1956  W. H. HOGAN  2,759,687
STEERING MECHANISM
Filed Sept. 14, 1955  6 Sheets-Sheet 2

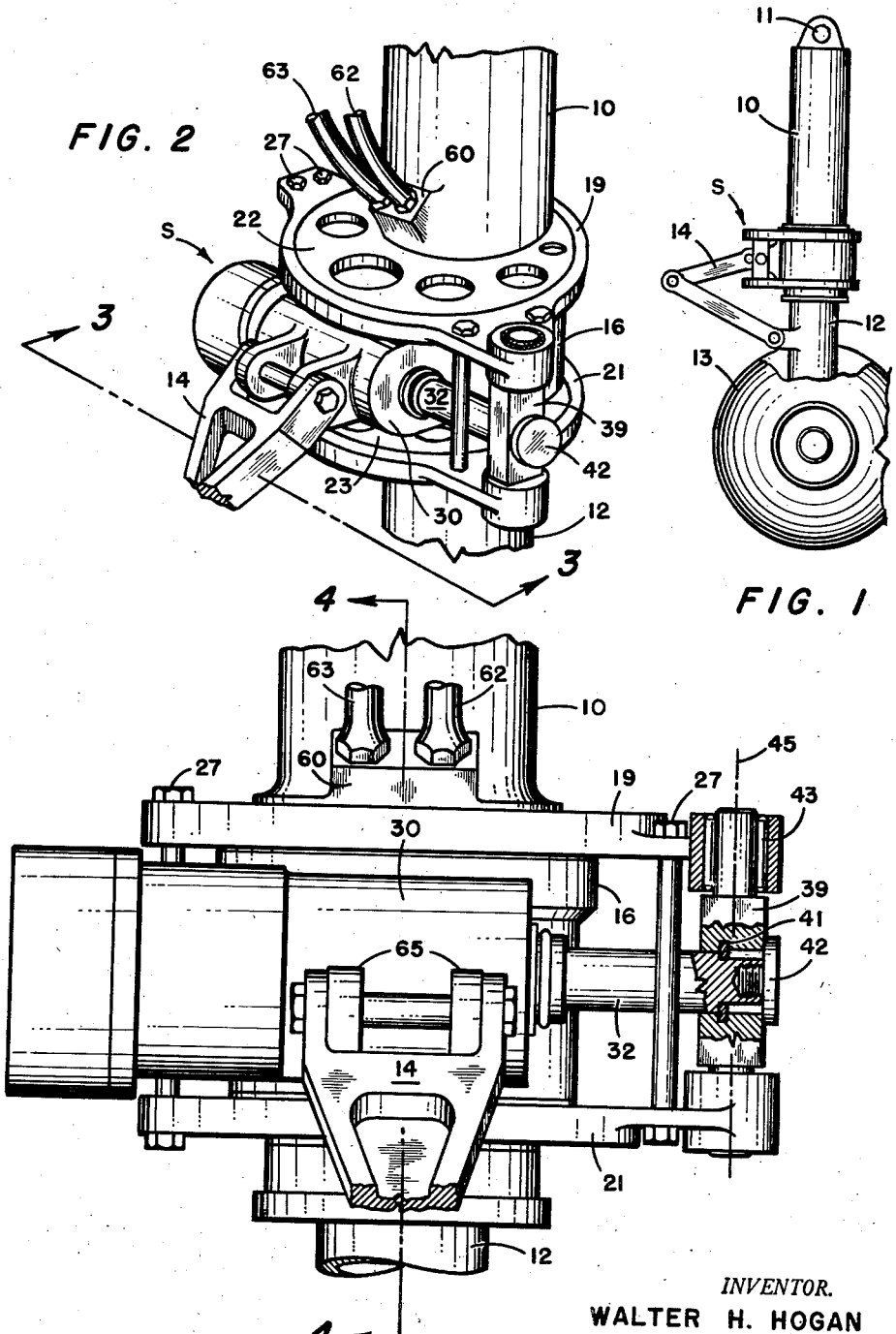

INVENTOR.
WALTER H. HOGAN
BY
ATTORNEY

Aug. 21, 1956 W. H. HOGAN 2,759,687
STEERING MECHANISM
Filed Sept. 14, 1955 6 Sheets-Sheet 3

INVENTOR.
WALTER H. HOGAN
BY
ATTORNEY

INVENTOR.
WALTER H. HOGAN
BY
ATTORNEY

INVENTOR.
WALTER H. HOGAN
BY
ATTORNEY

INVENTOR.
WALTER H. HOGAN
BY
ATTORNEY

United States Patent Office 2,759,687
Patented Aug. 21, 1956

2,759,687

STEERING MECHANISM

Walter H. Hogan, Olmsted Falls, Ohio, assignor to The Cleveland Pneumatic Tool Company, Cleveland, Ohio, a corporation of Ohio Application September 14, 1955, Serial No. 534,355

20 Claims. (Cl. 244—50)

This invention relates to power steering and more particularly to a power steering mechanism for aircraft which may be swiveled through 360° without being disconnected.

It is an important object of this invention to provide a new and improved power steering mechanism for aircraft landing gears that can be mounted intermediate the ends of the landing gear strut which is particularly suited for use when large steering angles are necessary.

It is another important object of this invention to provide a new and improved power steering mechanism for aircraft landing gears which permits the swiveling of the aircraft guided wheel through a full 360° without disconnecting the steering mechanism so that the aircraft can be maneuvered by ground handling tractors or the like in very confined areas.

It is still another object of this invention to provide a light-weight steering mechanism which can be used for power steering of an aircraft through relatively wide angles of steering and which permits full swiveling of the guided wheel through 360° without disconnecting the steering mechanism so that the aircraft can be maneuvered in confined areas.

Further objects and advantages will appear from the following description and drawings, wherein:

Figure 1 is a schematic view of an aircraft landing gear incorporating a power steering mechanism according to this invention;

Figure 2 is an enlarged fragmentary perspective view of the steering mechanism;

Figure 3 is a side elevation taken along 3—3 of Figure 2;

Figure 4:
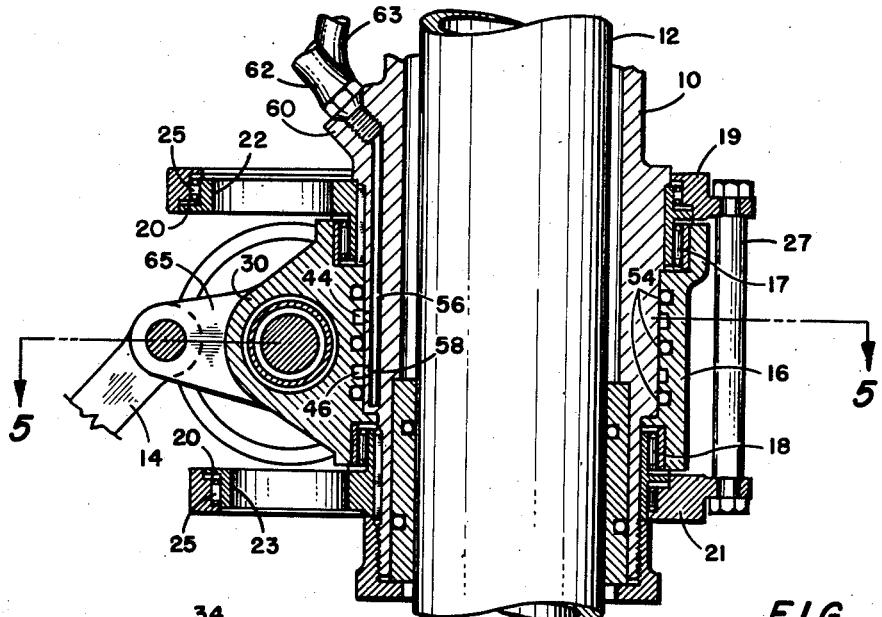
Figure 4 is a side elevation in longitudinal section taken along 4—4 of Figure 3.

In modern aircraft it is often necessary to provide a power steering mechanism which can be mounted intermediate the ends of the landing gear strut that is capable of turning an aircraft landing gear through relatively large steering angles so that the aircraft can be turned in a small area. It is also sometimes necessary to provide swiveling of the landing gear through a full 360° where the swiveling is accomplished by an external power source such as a ground handling tractor or the like. This latter feature is particularly desirable on shipboard aircraft where it is necessary to maneuver the aircraft in very confined quarters. The structure according to this invention meets both of these requirements and provides a steering mechanism which is relatively small, compact and light-weight.

Referring to the drawings, Figure 1 shows a conventional landing gear strut incorporating a steering mechanism according to this invention. The landing gear strut itself is provided with a shaft or outer telescoping member 10 adapted to be fixed to the frame of an aircraft by a mounting lug 11 and a lower or inner telescoping member 12 rotatable and axially movable relative to the upper member. A ground engaging wheel 13 is journaled on the lower telescoping member 12 and a conventional oleo mechanism is incorporated into the strut to absorb the shocks and impacts which occur during landing and take-off of the aircraft as well as support the weight of the aircraft when it is on the ground. The particular form of the oleo mechanism can be of any appropriate design and since it forms no part of this invention, it has not been shown. A steering mechanism shown generally at "S" is mounted on the lower end of the upper telescoping member 10 and torque arms 14 are connected between the steering mechanism "S" and the lower telescoping member 12. The torque arms are capable of transmitting the power steering torque to the lower telescoping member 12 while permitting free axial motion between the two telescoping members 10 and 12.

Figure 5:
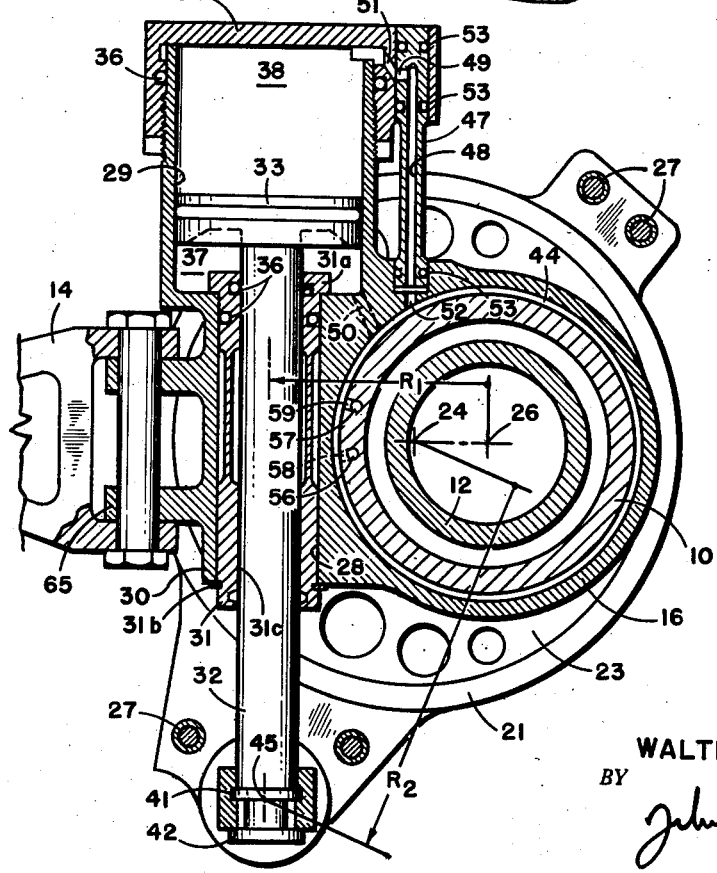
Figure 5 is a cross section taken along 5—5 of Figure 4.

Referring to Figures 3 through 5 the steering mechanism "S" incorporates three rings which are journaled for rotation around the upper telescoping member 10. These rings include a central ring 16 journaled on the upper telescoping member 10 by antifriction bearings 17 and 18 which permit the ring to rotate around the central axis 26 of the upper telescoping member 10 while preventing relative axial motion therebetween.

Two ring shaped cams 22 and 23 are keyed to the upper telescoping member 10 with one on either side of the central ring 16. Outer rings 19 and 21 are journaled on the cams 22 and 23 respectively by antifriction bearings 25 so that they can rotate relative to their respective cams around an axis 24 which is spaced from and parallel to the central axis 26. The mounting of the outer rings 19 and 21 on the cams 22 and 23 is also provided with a thrust surface 20 which prevents axial motion of the outer rings toward the central ring 16 and bolt fasteners 27 connect the outer rings and prevent axial motion thereof in a direction away from the central ring 16. Because the outer rings 19 and 21 are bolted together they turn as a unit around the axis 24. I prefer to use these two rings, one on either side of the central ring 16 to eliminate eccentric loading and unnecessary bending moments which such loading produces.

On one side of the central ring 16 is provided an enlarged portion 30 which is formed with first and second coaxial bores 28 and 29, the axis of which extends along one side of the central ring 16 in a plane perpendicular to the axes 24 and 26. A cylindrical slide bearing 31 is fixed in the first bore 28 by a shoulder 31a and a snap ring 31b and is provided with a central opening 31c through which the piston rod 32 extends. Thus the bearing 31 permits motion of the piston rod 32 along its axis relative to the central ring 16 while preventing lateral motion therebetween. A cap 34 threaded onto the enlarged portion 30 closes the second bore 29 and in cooperation therewith defines a cylinder in which a piston 33 moves. The piston 33 is mounted on the inner end of the piston rod 32 so that any force on the piston 33 developed by fluid under pressure in the cylinder is transmitted to the piston rod 32. Seals 36 mounted on the cap member 34 and the slide bearing 31 prevent fluid leakage out of the cylinder past the cap member 34 and along the piston rod 32. The piston 33 divides the cylinder into a first chamber 37 and a second chamber 38 so when fluid under pressure is supplied to the first chamber 37 a force is created on the piston 33 urging it axially in a direction which pulls the piston rod 32 into the bearing 31, and when fluid under pressure is supplied to the second chamber 38 a force is developed on the piston 33 which pushes the piston rod 32 out of the bearing 31.

The outer or free end of the piston rod 32 is firmly connected to a pivot pin 39, which extends perpendicularly therefrom in both directions, by a snap ring 41 and a bolt retainer 42. The ends of the pivot pin 39 form trunnions which are pivoted in bearings 43 mounted in the outer rings 19 and 21 respectively. Thus the piston rod 32 is mounted on the central ring 16 so that it can move only along its axis relative thereto and on the outer rings 19 and 21 so that it can only move in a pivotal manner relative thereto around the axis 45 of the bearings 43.

From a conduit or pressure hose 62 which has one end connected to a boss 60 provided on the upper telescoping member 10 above the cam 22, pressure fluid may be supplied to the first chamber 37 through a port 56 extending longitudinally within the wall of the upper telescoping member 10, which port opens through a radial passage 58 into an annular groove 46 formed within the central ring 16. From the groove 46 pressure fluid is free to flow into the chamber 37 through a cross port 50. From a second conduit or pressure hose 63 which has one end also connected to the boss 60, pressure fluid may be supplied to the second chamber 38 through a port 57 extending longitudinally within the wall of the upper telescoping member 10 which port opens through a radial passage 59 into a second annular groove 44 formed in the central ring 16 vertically spaced above the groove 46. The groove 44 is in constant communication with the second chamber 38 through a port 52 opening into one end of a tube 47 having a longitudinal passage 48 fixed to the central ring 16 and having its other end opening into the second chamber 38 through radial ports 49 and 51. Adequate packings such as 53 are provided to assure fluid tight joints between the tube 47 and the central ring 16. On each side of the groove 44 and 46 adequate ring packing 54 is provided to prevent the escape of pressure fluid from the grooves. Therefore when fluid under pressure is supplied to the pressure hose 62 the first chamber 37 is pressurized and a force is developed on the piston 33 and piston rod 32 pulling the piston rod into the bearing 31. When fluid under pressure is supplied to the pressure hose 63 the second chamber 38 is pressurized producing a force on the piston 33 which pushes the piston rod 32 out along the bearing 31. Thus the hydraulic connections can be rigidly mounted on the upper telescoping member 10 and yet supply the fluid motor regardless of the rotational position of the central ring 16 because of the swivel type fluid connection.

The upper end of the torque arms 14 are connected to the lugs 65 formed on the enlarged portion 30 so that rotational movement of the central ring 16 relative to the upper telescoping member 10 causes the lower telescoping member 12 to rotate therewith. It should be noted that both the lower telescoping member 12 and the central ring 16 rotate about the central axis 26 so this connection can be easily accomplished.

Figure 6A:
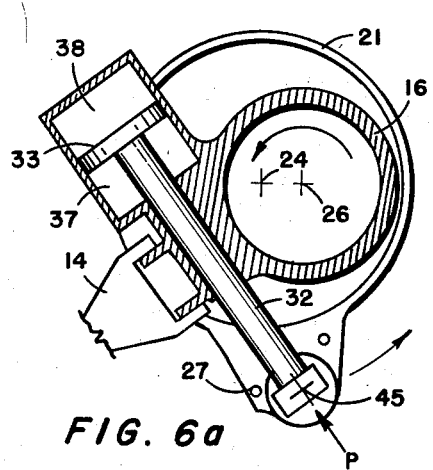
Figures 6a through 6h are schematic plan views of the steering mechanism illustrating the operation thereof.
Figure 6D:
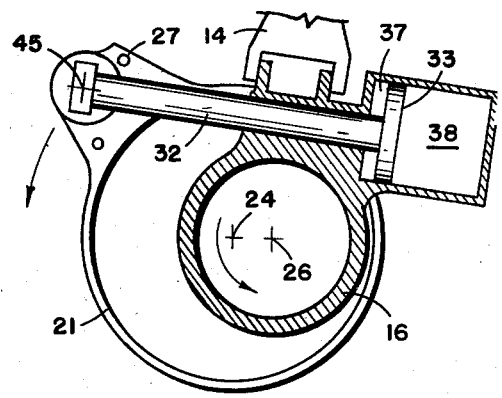
Figure 6B:
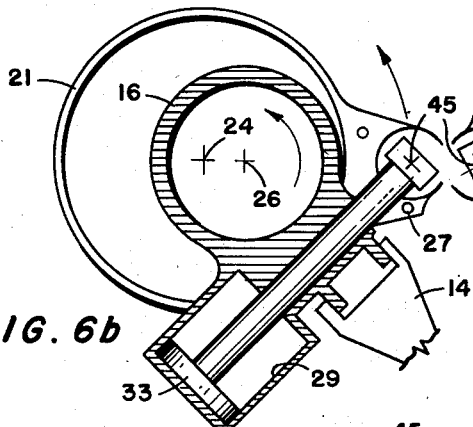
Figure 6E:
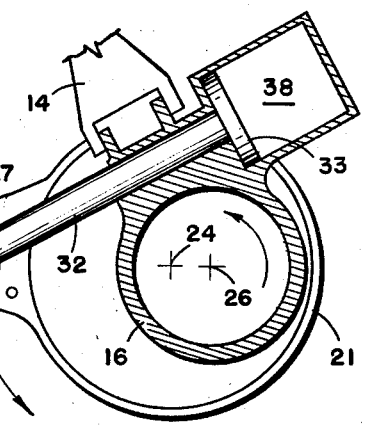
Figure 6C:
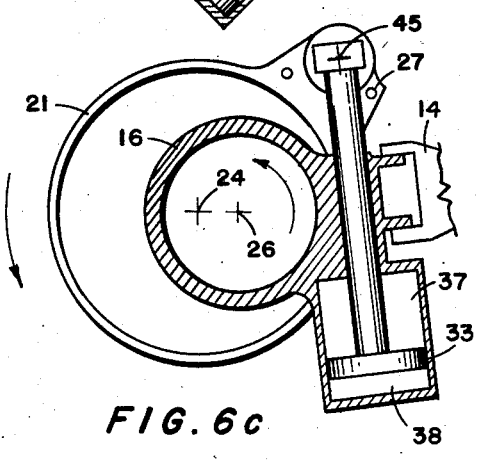
Figure 6F:
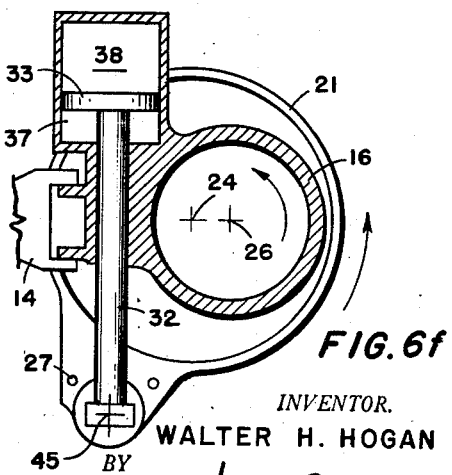
Figure 6G:
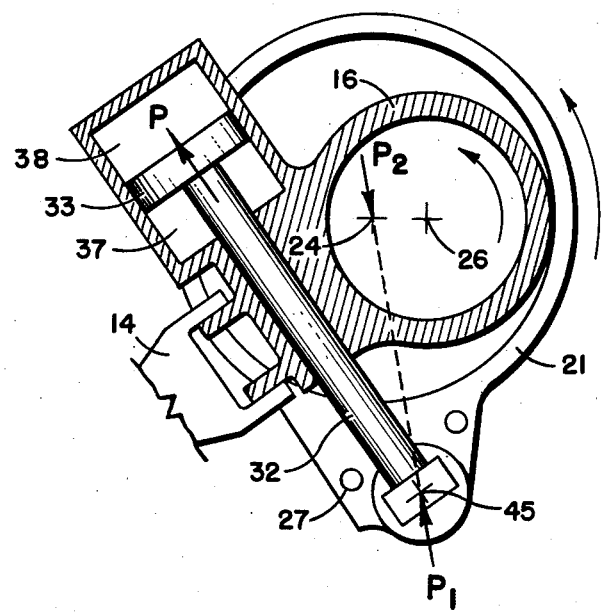
Figure 6H:
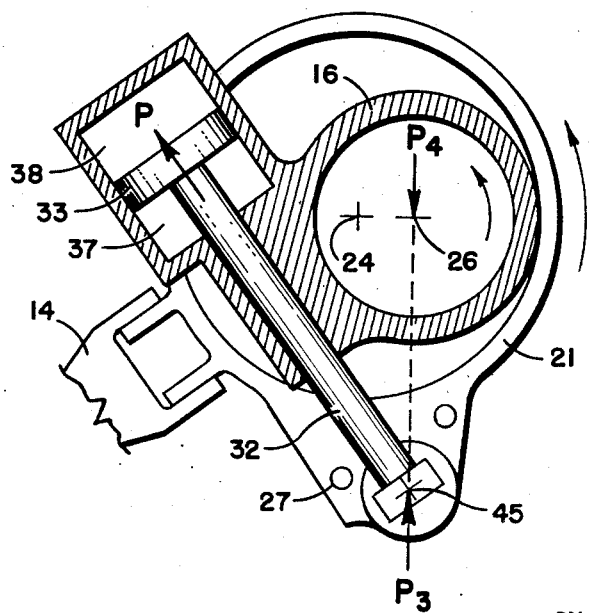
Figure 7:
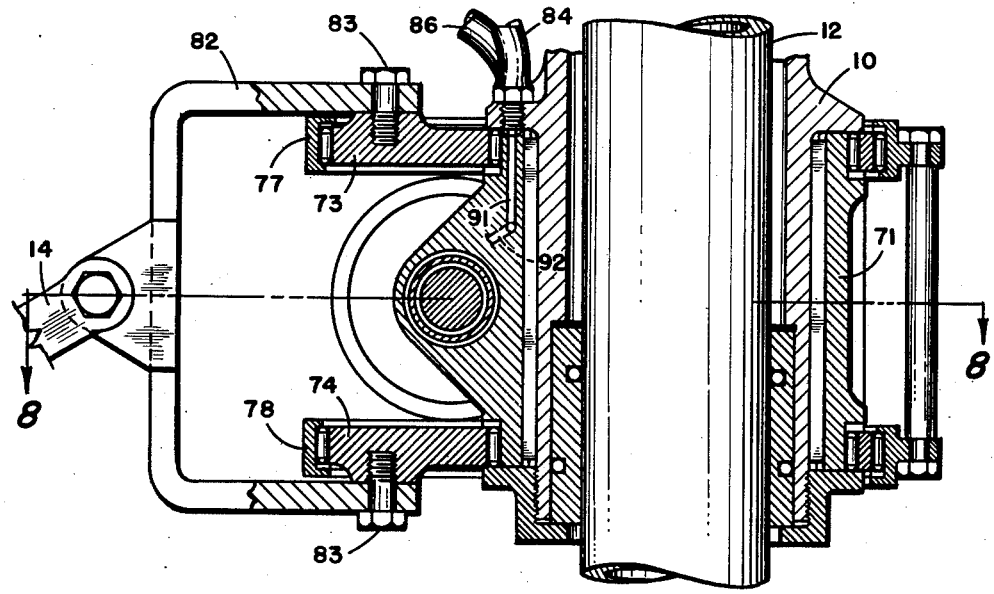
Figure 7 is a side elevation partially in longitudinal section showing another embodiment of this invention wherein the power cylinder is rigidly mounted on the strut member.
Figure 8:
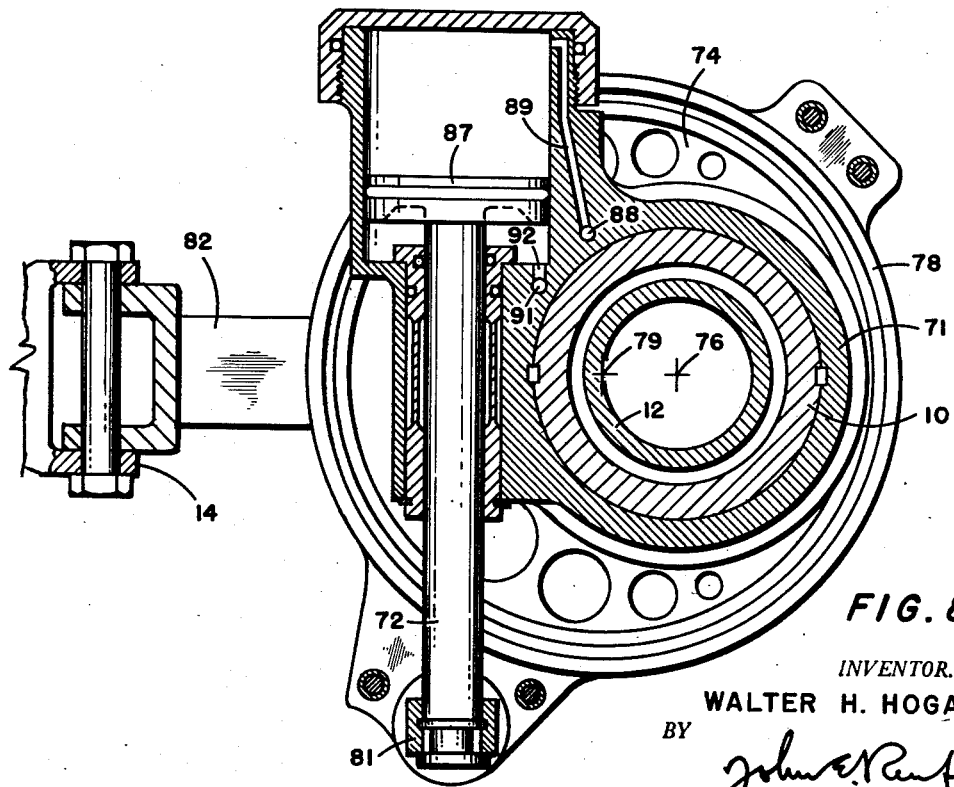
Figure 8 is a cross section taken along 8—8 of Figure 7.
Figure 9A:
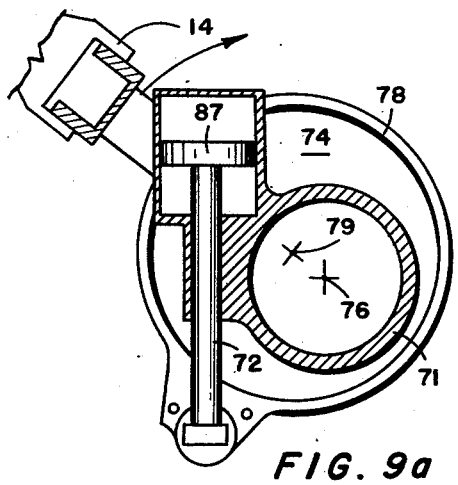
Figures 9a through 9f are schematic views of the embodiment shown in Figures 7 and 8 showing progressive positions of rotation.
Figure 9B:
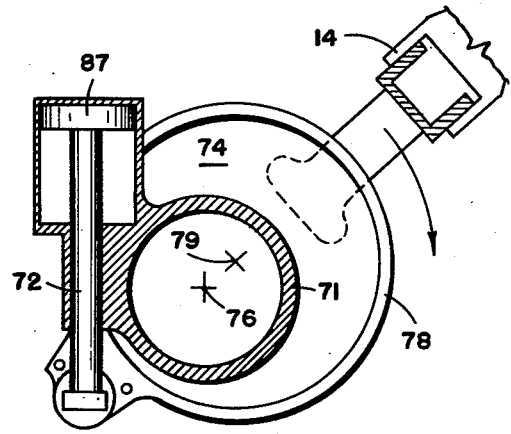
Figure 9C:
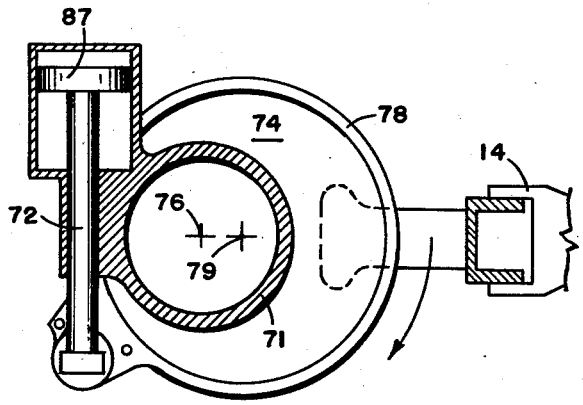
Figure 9D:
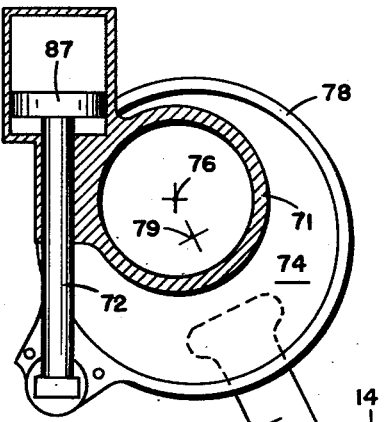
Figure 9E:
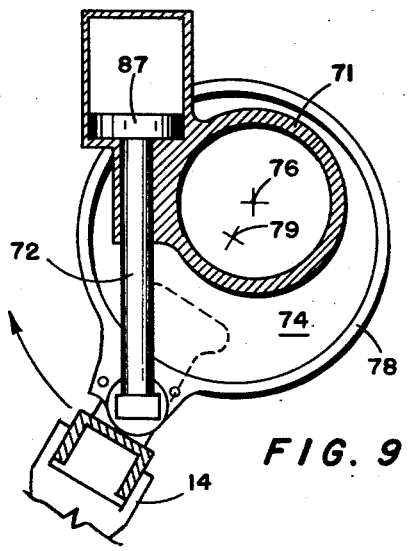
Figure 9F:
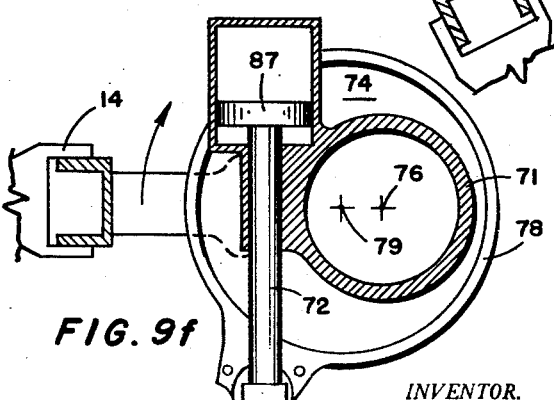

Reference should now be made to Figures 6a through 6h for a clear understanding of the operation of the steering mechanism. In these figures only the outer ring 21, which is rigidly connected to the outer ring 19 and forms therewith a single, unit, is shown. Figures 6g and 6h are schematic representations of the elements in the same position as shown in Figure 6a however the resultant reaction forces have been added. In Figures 6a, 6g and 6h the elements are shown in the neutral position of the steering mechanism wherein the wheel 13 is aligned with the axis of the aircraft. Referring to Figure 6g, if fluid under pressure is supplied to the first chamber 37, a force P is created on the piston rod 32 tending to pull it in a direction away from the pivot axis 45. If the rotational torque is to be supplied to the torque arms 14 from the central ring 16, the force P produces a resultant reaction force $P_1$ acting on the outer ring 21 along a line passing through the axis 24. Of course there is an equal and opposite resultant reaction force $P_2$ acting on the central ring 16 along the same line of action. This produces a counterclockwise turning moment on the central ring 16 because it does not pass through its central axis, which has a magnitude determined by the value of the force $P_2$ and the perpendicular distance between the line of action of the force and the central axis 26. The force $P_1$ does not create a turning moment on the outer ring 21 because the force $P_1$ passes through its center of rotation, namely the axis 24. However the outer ring 21 is caused to turn in a counterclockwise direction by its connection with the central ring 16 through the piston rod 32 and its pivot at 45.

It may be desirable to connect the torque arms 14 to the outer ring 21. If such an arrangement is used, the torque is removed from the outer ring 21. Reference should be made to Figure 6f wherein the resultant reaction forces are shown for this structure. Here again the force P is applied to the piston rod which creates a resultant reaction $P_3$ on the outer ring 21 which is acting on a line of action passing through the central axis 26. This creates an equal and opposite force $P_4$ on the central ring 16 acting through the central axis 26. Since the force $P_4$ on the central ring 16 passes through the center of rotation thereof it does not produce any turning moment on the central ring. However the force $P_3$ acting on the outer ring 21 produces a counterclockwise turning moment on the outer ring 21 having a magnitude determined by the value of the force $P_3$ and the perpendicular distance between the axis 24 and the line of action of the force $P_3$. Here again both of the rings rotate in the same direction due to the connection between the central ring 16 and the outer ring 21 at 45. Therefore if a force P is applied to the piston rod 32 pulling it axially in a direction away from the pivot axis 45 the rings will turn in a counterclockwise direction from the position shown in Figures 6a, 6g and 6f. If pressure fluid were supplied to the second chamber 38, a force is produced on the piston rod 32 urging it in a direction toward the pivot axis 45. Opposite resultant reaction forces are then developed and the rings will rotate in a clockwise direction from the position shown in Figure 6a.

Figure 6b shows the position of the elements when the pivot axis 45 is contained in a plane through the axes 24 and 26 and is on the side of the axis 26 remote from the axis 24. In this position the pivot axis 45 assumes the minimum spacing from the central axis 26. It should be understood that the rotational velocity of the two rings is different even though they both move in the same direction during this phase of operation because the piston 33 and the piston rod 32 move axially relative to the central ring. When the elements are in the position shown in Figure 6b, the piston 33 is at one extreme end of its travel within the cylinder so this position may be considered the bottom dead center position. In this instance the resultant reaction through 45 and either of the axes 24 and 26 can produce no turning moment about the other axis.

Assuming again the elements are in the neutral position of Figure 6a. If fluid under pressure is supplied to the second chamber 38, a force will be developed on the piston 33 which is transmitted to the piston rod 32 tending to push it out toward the pivot axis 45. Under such conditions the steering mechanism will rotate in a clockwise direction until the elements are in the position shown in Figure 6e wherein the pivot axis 45 is again in a plane containing the axes 24 and 26. However in this case the pivot axis 45 is on the same side of the central axis 26 as the axis 24 and is in the position where it assumes the maximum spacing from the central axis 26. At this time the piston 33 is in the opposite extreme position of travel so it is in its top dead center position. When the elements rotate from the neutral position of Figure 6a in a clockwise direction to the top dead center position of Figure 6e, the two rings rotate with a different velocity even though they rotate in the same direction.

By comparing the position of the elements in Figure 6b with the position of the elements in Figure 6e, it is apparent that the outer ring 21 is displaced 180° between these two positions. However, the central ring 16 in the position of Figure 6b is displaced from the position of Figure 6e by an angle greater than 180°. This occurs whenever a structure is provided wherein the axis of the piston rod 32 is spaced from the axis of rotation of the ring relative to which it moves axially. In other words since the piston rod 32 does not extend toward the central axis 26, the two dead center positions will be spaced from the neutral position by an angle greater than 90°. Thus a single cylinder is capable of producing power which can rotate the central ring 16 in either direction from the neutral position of Figure 6a through an angle greater than 90° as the piston 33 moves from the neutral position to one or the other of its extreme or dead center positions. However when either of the rings rotates from a given position through a full 360°, the other ring will also rotate through a full 360° and all the elements will return to the initial position. Therefore if the mechanism turns in a counterclockwise direction from the bottom dead center position of Figure 6b to the top dead center position of Figure 6e, the central ring 16 will rotate through an angle less than 180°; however if it rotates from the bottom dead center position of Figure 6b in a clockwise direction to the top dead center position of Figure 6e, it will rotate through an angle greater than 180°. The sum of these two angles of course is 360°.

Since it is desirable to provide a mechanism capable of wide angle steering, I choose the neutral steering position which is within the range of the angle which is greater than 180° so that the overall torque efficiency will be as large as possible throughout the entire steering range. In other words this structure provides a mechanism which could theoretically produce steering through a range greater than 180°. Therefore the overall torque efficiency will be greater if the steering power is supplied by the central ring 16 than if the steering power were supplied by either of the outer rings 19 or 21 even if the steering angle is less than the theoretical maximum. For this reason I prefer to connect the torque arms 14 to the central ring 16 rather than to either of the outer rings 19 or 21. Since all the rings move in the same direction there will be no interference between the bolt fasteners 27 and the piston rod 32 providing enough clearance is provided to accommodate the limited relative rotation between the central ring 16 and the outer ring 21.

It is felt that the above description when viewed in connection with the drawings and in particular Figures 6a through 6f clearly disclose the operation of the mechanism, but it should be understood that this discussion is not intended to cover in detail all of the force reactions which occur when the mechanism operates since such a discussion would require a complex mathematical analysis.

When operating this steering mechanism there are relatively large bending moments on the piston rod 32 in the horizontal plane. For this reason the structure I have shown, wherein the axis of the first bore does not intersect the upper telescoping member 10, is advantageous since it permits the use of a slide bearing 31 which extends for a relatively long distance along the piston rod 32. Therefore the bending moments in the piston rod are satisfactorily absorbed and not transmitted to the piston 33. Also, I prefer to arrange the bearing 31 so that it is close to the pivot pin 39 when the elements are in the bottom dead center position (see Figure 6b) so that the length of the piston rod 32 beyond the bearing 31 will always be as short as possible. The second bore 29 should also extend to a position close to the inner surface of the central ring 16 so that the most remote point of the cap member 34 will be as close as possible to the central axis 26 of the strut. This is particularly important in aircraft installations wherein the landing gear is retractable since it reduces to a minimum the size of the envelope of the steering mechanism and therefore reduces the amount of space necessary for the retracted landing gear.

It is necessary that the radius $R_1$ plus the distance between the central axis 26 and the axis 24 be no greater than the radius $R_2$ where the radius $R_1$ is the perpendicular distance from the axis of the piston rod 32 from the central axis 26 and the radius $R_2$ is the distance between the axis 24 and the pivot axis 45. If this limitation is not met, the system will jam and not permit full swiveling.

If it is desired to swivel the wheel 13 through a full 360° with an external source for the power such as a ground handling vehicle or tractor connected to the lower telescoping member, it is not necessary to disconnect the steering mechanism. This is clearly illustrated by Figures 6a through 6f which show the position of the elements as the inner ring 16 progressively rotates through a full 360°. Assuming the elements are in the position shown in Figure 6a, rotation of the central ring 16 through a full 360° in a counterclockwise direction will cause the elements to progressively move to the position shown in Figure 6b and then to the position of Figure 6c and on around through the position shown in Figure 6f back to the position of Figure 6a. During this movement the piston 33 will go through a complete cycle from the central position of Figure 6a to the bottom dead center position of Figure 6b then to the top dead center position of Figure 6e and back to the central position of Figure 6a. When swiveling is desired, the two pressure hoses 62 and 63 are merely connected together so that there will be relatively little hydraulic resistance to the movement.

Those skilled in the art will also recognize that if the control valve mechanism in the hydraulic circuit is provided with metering orifices, effective shimmy dampening will be accomplished because rotational movement of the rings causes axial motion of the piston. Normally when shimmy dampening is required the first chamber 37 is connected to the second chamber 38 through a throttle or metering orifice which will dampen motion of the piston 33. A control valve which would be suitable for use to control both shimmy dampening and the steering is shown in my copending application serial number 489,987 filed February 23, 1955.

In the embodiment of this invention shown in Figures 7, 8 and 9a through 9f, a central ring 71 is mounted on the upper telescoping member 10 so that it is axially and rotationally fixed relative thereto. A piston and cylinder structure similar to the one shown in the first embodiment is utilized so that a detailed description of the structure will not be necessary. As in the previous embodiment a piston 72 is axially slidable within the central ring 71. Similar ring cams 73 and 74 are journaled on the upper telescoping member 10 for rotation around the central axis 76 of the strut. Also outer rings 77 and 78 are journaled for rotation relative to the cams 73 and 74 respectively around a pivot axis 79 spaced from the central axis 76. The piston rod 72 is connected to a pivot pin 81 which is pivotally connected between the outer rings 77 and 78. The torque arms 14 are connected to a bracket member 82 which is mounted on the cams 73 and 74 by bolt fasteners 83.

In this embodiment the relative motion between the various elements of the steering mechanism is identical with the relative movement between corresponding elements in the embodiment of Figures 1 through 6 so axial motion of the piston rod 72 produces relative rotation between the central ring 71 and the cams 73 and 74 and relative rotation between the outer rings 77 and 78 and the cams 73 and 74. It will be remembered that in the previous embodiment the cams 22 and 23 are fixed to the upper telescoping member 10 and that the central ring 16 rotates. In this embodiment, however, I use the same relative motion between the rings and cams but fix the central ring 71 to the upper telescoping member 10 and cause the cams 73 and 74 to rotate therearound. This eliminates the need for a swivel hydraulic connection since the cylinder is stationary and it is merely necessary to provide pressure hoses 84 and 86 which are connected to two opposite sides of a piston 87 through passages 88, 89, 91 and 92 best shown in Figure 8. Assuming the elements are in the position shown in Figure 8, if fluid under pressure is supplied to the outer side of the piston 87, a force will be produced which pushes the piston rod 72 toward the pivot pin 81 which will cause the cams 73 and 74 to rotate in a counterclockwise direction. Conversely if fluid under pressure is supplied to the opposite side of the piston 87 a force will be produced in the piston rod 72 which pulls it in a direction away from the pivot pin 81 which will cause the cams 73 and 74 to rotate in a clockwise direction. Here again full swiveling is provided as illustrated by Figures 9a through 9f where the cams 73 and 74 are shown as they progressively rotate through a full 360° from the position shown in Figure 9a to the position shown in Figure 9b and then to the position of Figure 9c and on around and back to the position shown in Figure 9a. Here again shimmy dampening may be provided if a suitable control valve means having restrictive orifices is utilized.

In both embodiments, two outer rings are utilized so that the force on the piston rods will be symmetrically absorbed by the rings and unnecessary bending moments in the piston rod are eliminated. Those skilled in the art will recognize that by utilizing a steering mechanism incorporating this invention, large angles of steering may be produced with a relatively small steering mechanism and also that full swiveling may be achieved without disconnecting the steering mechanism.

Although preferred embodiments of this invention are illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. In a steering mechanism adapted to be mounted on a load carrying strut intermediate the ends thereof, a cam member, a first and second ring member, all of said members mounted on said strut for relative rotation of said cam and first ring member about a first axis and for relative rotation of said cam and second ring member about a second axis offset from but parallel to said first axis, and motor means connected between the said two ring members in a manner effecting rotation of at least one of said members about its own axis.

2. In a steering mechanism adapted to be mounted on a load supporting strut intermediate the ends thereof, a first and second member mounted for rotation relative to one another about a first axis, a third member mounted with respect to said first member for relative rotary motion therebetween about a second axis spaced from and parallel to said first axis, said strut extending through all said members, one of said members being fixed relative to said strut, fluid motor means including cooperating piston and cylinder elements capable of relative axial motion connected between said second and third members with the connection of one of said elements and its associated member preventing relative motion therebetween and the connection of the other of said elements and its associated member permitting only pivotal motion therebetween.

3. In a steering mechanism of the character described a cylindrical member, a first ring mounted for rotation relative to said cylindrical member about a first axis, a second ring mounted for rotation relative to said cylindrical member about a second axis spaced from and parallel to said first axis, motor means including cooperating first and second elements capable of relative axial motion connected between said rings with the connection of one of said elements and its associated ring preventing relative motion therebetween and the connection of the other of said elements and its associated ring permitting only pivotal motion therebetween.

4. In a steering mechanism a cam member, a first and a second ring member, a stationary shaft element extending through all of said members, a fixed connection between one of said members and shaft element, said cam and first ring member being susceptible of relative rotation about a first axis, said cam and second ring member being susceptible of relative rotation about a second axis offset from but parallel to said first axis, and means adapted to be power driven connected between two of said members in a manner effecting rotation of at least one of said members about its own axis.

5. In a steering mechanism of the character described a cylindrical member, a first ring journaled on said cylindrical member for rotary motion relative thereto around a first axis, a second ring journaled on said cylindrical member for rotary motion relative thereto about a second axis spaced from and parallel to said first axis, fluid motor means including cooperating piston and cylinder elements capable of relative axial motion connected between said rings with the piston element movable relative to said first ring along the piston axis and connected to said second element for pivotal motion relative thereto.

6. In a steering mechanism of the character described a cylindrical member, a first ring journaled on said cylindrical member for rotary motion relative thereto about the center axis thereof, circular bearing means fixed on said cylindrical member eccentrically relative to the center axis thereof, a second ring journaled on said bearing means, and motor means connected between said rings in a manner effecting rotation of at least one of said rings about its own axis.

7. In a steering mechanism of the character described a first member, a second member, first bearing means between said first and second members enabling relative rotary motion therebetween about a first axis, a third member, second bearing means between said first and third members enabling relative rotary motion therebetween around a second axis spaced from and parallel to said first axis, the areas within said first and second bearing means overlapping each other, a shaft extending through the overlapped portions of said areas, one of said members being fixed relative to said shaft, fluid motor means including cooperating piston and cylinder elements capable of relative axial motion connected between said second and third members with the connection of one of said elements and its associated member preventing relative motion therebetween and the connection of the other of said elements and its associated member permitting only pivotal motion therebetween.

8. An aircraft steering mechanism comprising a pair of relatively rotatable members one adapted to be mounted on the frame of an aircraft and the other being provided with a ground engaging member, a first and a second ring, first bearing means supporting said first and second rings for relative rotary motion therebetween about a first axis, a third ring, second bearing means supporting said first ring and third ring for relative rotary motion therebetween about a second axis spaced from and parallel to said first axis, all of said rings extending around said one member and one of said rings being fixed relative thereto, fluid motor means including cooperating piston and cylinder elements capable of relative axial motion connected between said second and third rings with the connection of one of said elements and its associated ring preventing relative motion therebetween and the connection of the other of said elements and its associated ring permitting only pivotal motion therebetween whereby relative rotation is produced between said first ring and the other of said rings upon relative axial motion between said piston and cylinder elements, and torque means transmitting said relative rotation to said other member.

9. An aircraft steering mechanism comprising first and second cylindrical members relatively rotatable one within the other about a first axis, a first ring mounted around one of said members for rotary motion relative thereto about said first axis, a second ring mounted around said one member for rotary motion relative thereto around a second axis spaced from and parallel to said first axis, fluid motor means including cooperating piston and cylinder elements capable of relative axial motion connected between said rings with the connection of said first ring and its associated element preventing relative motion therebetween and the connection of said second ring and its associated element permitting only pivotal motion therebetween, whereby relative rotation is produced between said first member and said rings upon relative axial motion between said piston and cylinder elements, and torque means transmitting said relative rotation of said first ring to said second member.

10. An aircraft steering mechanism comprising first and second relatively rotatable cylindrical members, a cam member journaled around one of said cylindrical members for rotary motion relative thereto about a first axis, a ring member journaled around said cam member for rotary motion relative thereto around a second axis spaced from and parallel to said first axis, fluid motor means including cooperating piston and cylinder elements capable of relative axial motion connected between said ring member and said one cylindrical member with the connection of one of said elements and its associated member preventing relative motion therebetween and the connection of the other of said elements and its associated member permitting only pivotal motion therebetween whereby relative rotation is produced between said cam member and said one cylindrical member upon relative axial motion between said piston and cylinder elements, and torque means transmitting said relative rotation to the other of said cylindrical members.

11. A steering mechanism comprising first and second relatively rotatable members, a first ring around said first member rotatable relative thereto about a first axis, said first ring being formed with cylinder means, a fluid actuated piston in said cylinder axially movable relative thereto, a second ring around said first member rotatable relative thereto about a second axis spaced from said first axis, pivot means connecting said piston and second ring whereby said rings rotate around said first member upon relative axial motion between said piston and cylinder means, and torque transmitting means connecting said second member and one of said rings.

12. A steering mechanism comprising first and second relatively rotatable telescoping members, a first ring around said first member rotatable relative thereto about a first axis, a fluid actuated motor carried by said ring including a piston axially movable relative to said ring between first and second extreme positions, the axis of said piston being spaced from said first axis in a plane perpendicular thereto, a second ring around said first member rotatable relative thereto about a second axis spaced from said first axis, pivot means connecting said piston and second ring whereby said rings rotate around said first member upon axial motion of said piston relative to said first ring, said first ring rotating through an angle greater than 180° when said piston moves between said extreme positions, and torque transmitting means connecting said first ring to said second member.

13. A steering mechanism comprising first and second telescoping and relatively rotatable cylinders, a first ring around said first cylinder rotatable relative thereto about a first axis, a fluid actuated motor carried by said ring including a piston axially movable relative thereto, a second ring around said first cylinder rotatable relative thereto about a second axis spaced from and parallel to said first axis, pivot means connecting said piston and second ring whereby said rings rotate around said first cylinder upon relative axial motion between said piston and first ring, swiveled fluid conducting means between said first cylinder and motor adapted to connect said motor to a source of pressure fluid, and torque transmitting means connecting said first ring to said second cylinder.

14. A steering mechanism comprising first and second relatively rotatable members, cylinder means fixed on said first member against movement relative thereto, a fluid actuated piston axially movable in said cylinder means, a first ring mounted around said first member for rotation relative thereto about a first axis, a second ring mounted on said first ring for rotary motion relative thereto around a second axis spaced from and parallel to said first axis, pivot means connecting said piston and said second ring whereby said first ring rotates relative to said first rotatable member upon axial motion of said piston relative to said cylinder means, and torque transmitting means connected between said first ring and said second member.

15. A steering mechanism comprising first and second telescoping and relatively rotatable members, cylinder means fixed on said first member against movement relative thereto, a fluid actuated piston axially movable in said cylinder means between two extreme positions wherein the axis of said piston extends past one side of said first member, a first ring mounted around said first member for rotation relative thereto about a first axis, a second ring mounted on said first ring for rotary motion relative thereto around a second axis spaced from and parallel to said first axis, pivot means connecting said piston and said second ring whereby said first ring rotates relative to said first member through an angle greater than 180° upon axial motion of said piston relative to said cylinder means between said extreme positions, and torque transmitting means connecting said first ring to said second member.

16. In a steering mechanism of the character described a first member, a second member, first bearing means supporting said first and second members for relative rotary motion therebetween about a first axis, a third member, second bearing means supporting said first member and third member for relative rotary motion therebetween around a second axis spaced from and parallel to said first axis, a substantially straight shaft extending through all of said members, one of said members being fixed relative to said shaft, fluid motor means including cooperating piston and cylinder elements capable of relative axial motion, said cylinder element being fixed against movement relative to said first member and said piston element being pivotally connected to said third member, the distance between said first axis and the closest point on said piston axis plus the distance between said first and second axis being no greater than the distance between said second axis on the axis of the pivotal connection between said piston element and third member whereby at least one of said members can rotate around said shaft through a complete revolution.

17. A steering mechanism comprising first and second relatively rotatable members, a first ring around said first member rotatable relative thereto about a first axis, a fluid actuated motor carried by said first ring including a piston axially movable relative thereto, a second ring around said first member rotatable relative thereto about a second axis spaced from said first axis, pivot means connecting said piston and second ring whereby said rings rotate around said first member upon relative axial motion between said piston and first ring, the distance between said first axis and the nearest point on the axis of said piston plus the distance between said first and second axes being no greater than the distance between said second axis and the axis of the pivotal connection between said piston and second ring.

18. A steering mechanism comprising first and second telescoping members relatively rotatable about a first axis, power actuated means carried by said first member including a piston axially movable relative thereto, a first ring mounted around said first member for rotation relative thereto about said first axis, a second ring mounted on said first ring for rotary motion relative thereto around a second axis spaced from and parallel to said first axis, pivot means connecting said piston and said second ring whereby said first ring member rotates relative to said first member upon axial motion of said piston relative to said first member, and torque transmitting means connected between said second ring and said second member, the distance between said first axis and the nearest point on the axis of said piston plus the distance between said first and second axes being no greater than the distance between said second axis and the axis of the pivotal connection between said piston and second ring.

19. An aircraft steering mechanism comprising a pair of telescoping and relatively rotatable members one adapted to be mounted on the frame of an aircraft and the other being provided with a ground engaging member, a first and a second ring, first bearing means supporting said first and second rings for relative rotary motion therebetween about a first axis, a third ring, second bearing means supporting said first ring and third ring for relative rotary motion therebetween around a second axis spaced from and parallel to said first axis, all of said rings extending around said one member and one of said rings being fixed relative thereto, fluid motor means including cooperating piston and cylinder elements capable of relative axial motion connected between said second and third rings with the connection of one of said elements and its associated ring preventing relative motion therebetween and the connection of the other of said elements and its associated ring permitting only pivotal motion therebetween whereby relative rotation is produced between said first ring and the other of said rings upon relative axial motion between said piston and cylinder elements, the axis of said one element extending to one side of the axis of rotation of its associated ring, and torque means transmitting said relative rotation to said other members.

20. An aircraft steering mechanism comprising a pair of telescoping and relatively rotatable cylindrical members, the outer member adapted to be mounted on the frame of an aircraft and the inner member carrying a ground engaging wheel, a first ring mounted on said outer member near the inner end thereof for rotation relative thereto about the center axis of said members, motor means including first and second relatively movable elements, a fixed connection between said first element and ring, a second ring around said outer member rotatable relative thereto about an axis offset from but parallel to the axis of said members, and a pivotal connection between said second element and said second ring.

References Cited in the file of this patent
UNITED STATES PATENTS

| | | |
|---|---|---|
| 2,424,233 | Greenough | July 22, 1947 |
| 2,492,649 | MacDuff | Dec. 27, 1949 |
| 2,508,057 | Bishop | May 16, 1950 |
| 2,650,782 | Fehring | Sept. 1, 1953 |